(12) United States Patent
Li et al.

(10) Patent No.: US 9,127,154 B2
(45) Date of Patent: *Sep. 8, 2015

(54) IMPACT RESISTANT, FLAME RETARDANT THERMOPLASTIC MOLDING COMPOSITION

(75) Inventors: Xiangyang Li, Seven Fields, PA (US); James P. Mason, Carnegie, PA (US); Marty Boykin, Wexford, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 42 days.

This patent is subject to a terminal disclaimer.

(21) Appl. No.: 11/580,502

(22) Filed: Oct. 13, 2006

(65) Prior Publication Data
US 2008/0090961 A1 Apr. 17, 2008

(51) Int. Cl.
| | |
|---|---|
| C08L 69/00 | (2006.01) |
| C08L 51/08 | (2006.01) |
| C08K 5/523 | (2006.01) |
| C08L 27/18 | (2006.01) |
| C08L 51/00 | (2006.01) |
| C08L 51/06 | (2006.01) |
| C08L 67/02 | (2006.01) |

(52) U.S. Cl.
CPC .............. *C08L 69/00* (2013.01); *C08L 69/005* (2013.01); *C08K 5/523* (2013.01); *C08L 27/18* (2013.01); *C08L 51/003* (2013.01); *C08L 51/06* (2013.01); *C08L 51/08* (2013.01); *C08L 51/085* (2013.01); *C08L 67/02* (2013.01)

(58) Field of Classification Search
USPC .......................................................... 525/63
See application file for complete search history.

(56) References Cited

U.S. PATENT DOCUMENTS

| | | | |
|---|---|---|---|
| 4,888,388 A | 12/1989 | Hongo et al. ................... 525/67 |
| 4,963,619 A | 10/1990 | Wittmann et al. .............. 525/67 |
| 6,197,857 B1 | 3/2001 | Nodera et al. |
| 6,423,766 B1 | 7/2002 | Itagaki ........................... 524/127 |
| 6,562,887 B1* | 5/2003 | Kurasawa et al. ............. 524/269 |
| 7,067,567 B2 | 6/2006 | Seidel et al. ................... 523/201 |
| 7,220,790 B2 | 5/2007 | Seidel et al. |
| 8,217,101 B2* | 7/2012 | Li .................................. 524/127 |
| 2002/0177648 A1* | 11/2002 | Isozaki ......................... 524/451 |
| 2003/0181603 A1* | 9/2003 | Venderbosch et al. ........ 525/461 |
| 2004/0132877 A1* | 7/2004 | Seidel et al. ................... 524/115 |
| 2005/0038149 A1 | 2/2005 | Hashimoto et al. |
| 2006/0100296 A1* | 5/2006 | Wilkes et al. ................. 521/134 |
| 2010/0160508 A1* | 6/2010 | Taschner et al. .............. 524/127 |

FOREIGN PATENT DOCUMENTS

| | | |
|---|---|---|
| JP | 4-345657 | 12/1992 |
| JP | 7-316409 | 12/1995 |
| JP | 8-259791 | 10/1996 |
| JP | 2000017136 A | 1/2000 |
| JP | 2001-31860 | 2/2001 |

OTHER PUBLICATIONS

Sergi V. Levchik and Edward D. Weil, Flame Retardancy of Thermoplastic Polyesters—A Review of the Recent Literature, Polymer International, pp. 11-35 (2005).

Richard E. Lyon and Marc L. Janssens, Polymer Flammability, 82 pages, National Technical Information Service (NTIS), (2005), 82 pages.

* cited by examiner

*Primary Examiner* — Jeffrey Mullis
(74) *Attorney, Agent, or Firm* — Richard P. Bender; John E. Mrozinski, Jr.; Aron Preis

(57) ABSTRACT

A thermoplastic molding composition characterized by its flame retardance and impact strength is disclosed. The composition contains A) 70 to 99 parts by weight of aromatic poly(ester) carbonate B) 1 to 30 parts by weight of polyalkylene terephthalate, the total weight of A) and B) being 100 parts resin, and C) 1 to 20 parts per hundred parts resin (phr) of graft (co)polymer having a core-shell morphology, including a grafted shell that contains polymerized alkyl(meth) acrylate and a composite rubber core that contains interpenetrated and inseparable polyorganosiloxane and poly(meth) alkyl acrylate components, D) 2 to 20 phr of a phosphorous-containing compound, and E) 0.1 to 2 part by weight of fluorinated polyolefin.

13 Claims, No Drawings

IMPACT RESISTANT, FLAME RETARDANT THERMOPLASTIC MOLDING COMPOSITION

FIELD OF THE INVENTION

The invention relates to an impact-modified, flame retardant thermoplastic molding composition containing polycarbonate and aromatic polyester.

TECHNICAL BACKGROUND OF THE INVENTION

Impact-modified blends of polycarbonate and aromatic polyesters are known. Corresponding flame resistant compositions are also known as are halogen-free flame retarding agents.

JP 2001 031 860 is considered to disclose a high impact strength composition said to be hydrolytically stable and chemically resistant. The composition contains polycarbonate, a mixture of polyethylene terephthalate and polybutylene terephthalate, a graft elastomer having a core-shell structure, a silicate salt, stabilized red phosphorus and polytetrafluoroethylene.

A composition containing aromatic polycarbonate resin, an aromatic polyester resin and a specific high-molecular weight halogenated bisphenol epoxy resin is disclosed in JP 6 239 965. The disclosed composition is said to feature excellent flame-retardance, chemical resistance, impact resistance and thermal stability. An impact modified thermoplastic molding composition containing polycarbonate, polyalkylene terephthalate and a graft (co)polymer wherein the graft base includes a rubber selected from a group that includes silicone-acrylate composite has been disclosed in U.S. Pat. No. 7,067,567. The graft (co)polymer is exemplified by methyl methacrylate-grafted silicone-butyl acrylate composite rubber. An impact resistance composition containing polycarbonate, polyethylene terephthalate and graft polymer based on a silicone-butyl acrylate composite rubber is disclosed in U.S. Pat. No. 4,888,388.

A flame retardant, chemically resistant and thermally stable composition containing a halogenated aromatic polycarbonate resin, aromatic polyester resin, and graft rubber polymer composite is disclosed in JP 04 345 657. The graft rubber is said to be obtained by grafting vinyl monomer(s) onto rubber particles consisting of a poly-organosiloxane rubber and a polyalkyl(meth)acrylate rubber entangled with each other so as not to be separated from each other.

JP8259791 is considered to disclose a flame-retardant resin composition said to feature excellent impact resistance and flame retardance and containing polycarbonate resin with a phosphoric ester compound and a specific composite-rubber-based graft copolymer. The composite-rubber-based graft copolymer is obtained by grafting at least one vinyl monomer (e.g. methyl methacrylate) onto a composite rubber that contains 30-99% polyorganosiloxane component and 70-1% of poly alkyl(meth)acrylate rubber component.

JP 7316409 disclosed a composition having good impact resistance and flame retardance containing polycarbonate, phosphoric ester and a specified graft copolymer based on a composite rubber. The graft copolymer is obtained by graft polymerization of one or more vinyl monomers onto a composite rubber in which polyorganosiloxane component and polyalkyl(meth)acrylate rubber component are entangled together so as not to be separable.

U.S. Pat. No. 4,963,619 disclosed a thermoplastic polycarbonate molding composition containing polycarbonates, siloxane-containing graft polymers and, optionally, other thermoplasts and/or standard additives. The composition is said to feature high toughness, particularly at low temperatures.

U.S. Pat. No. 6,423,766 disclosed a flame-retardant polycarbonate resin composition, containing polycarbonate resin, a composite rubbery graft copolymer, a halogen-free phosphoric ester and polytetrafluoroethylene. The composition is said to exhibit improved mechanical properties, moldability, flowability, and flame retardance. The graft rubber is based on polyorganosiloxane rubber component and polyalkyl acrylate rubber component and the two components are intertwisted and inseparable from each other. The grafted rubber is grafted with one or more vinyl monomers.

SUMMARY OF THE INVENTION

A thermoplastic molding composition characterized by its flame retardance and impact strength is disclosed. The composition contains A) 70 to 99 parts by weight of aromatic poly(ester) carbonate B) 1 to 30 parts by weight of polyalkylene terephthalate, the total weight of A) and B) being 100 parts resin, and C) 1 to 20 parts per hundred parts resin (phr) of graft (co)polymer having a core-shell morphology, including a grafted shell that contains polymerized alkyl(meth)acrylate and a composite rubber core that contains interpenetrated and inseparable polyorganosiloxane and poly(meth)alkyl acrylate components, D) 2 to 20 phr of a phosphorous-containing compound, and E) 0.1 to 2 parts by weight of fluorinated polyolefin.

DETAILED DESCRIPTION OF THE INVENTION

The inventive composition contains
A) 70 to 99 percent by weight (pbw), preferably 75 to 95 pbw, most preferably 80 to 95 pbw of aromatic poly(ester) carbonate having a weight-average molecular weight of at least 25,000 preferably at least 26,000 g/mol.,
B) 1 to 30 preferably 5 to 25 most preferably 5 to 20 pbw of polyalkylene terephthalate, wherein the weight of A) and B) totals 100 parts (100 parts resin)
C) 1 to 20 preferably 2 to 15, more preferably 5 to 12 most preferably 7 to 10 parts per 100 parts resin (herein phr) of a graft (co)polymer having a core-shell morphology, comprising a grafted shell that contains polymerized alkyl (meth)acrylate and a composite rubber core that contains interpenetrated and inseparable polyorganosiloxane and poly(meth)alkyl acrylate components,
D) 2 to 20, preferably 5 to 15, particularly preferably 7 to 15, most preferably 10 to 15 phr of a phosphorus-containing compound, preferably organic phosphoric or phosphonic acid ester, and
E) 0.1 to 2, preferably 0.2 to 1, most preferably 0.2 to 0.5 phr of a fluorinated polyolefin.

Any numerical range recited herein is intended to include all sub-ranges subsumed therein.

Component A

Suitable aromatic (co)polycarbonates and/or aromatic polyester carbonates are known. (Co)polycarbonates may be prepared by known processes (see for instance Schnell's "Chemistry and Physics of Polycarbonates", Interscience Publishers, 1964) and are widely available in commerce, for instance from Bayer MaterialScience under the trademark Makrolon®.

Aromatic polycarbonates may be prepared by the known melt process or the phase boundary process.

Aromatic dihydroxy compounds suitable for the preparation of aromatic polycarbonates and/or aromatic polyester carbonates conform to formula (I)

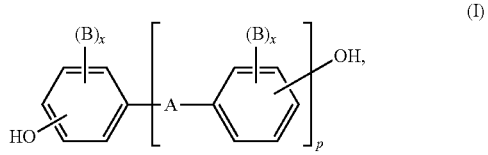

wherein
A represents a single bond, $C_1$- to $C_5$-alkylene, $C_2$- to $C_5$-alkylidene, $C_5$- to $C_6$-cycloalkylidene, —O—, —SO—, —CO—, —S—, —SO$_2$—, $C_6$- to $C_{12}$-arylene, to which there may be condensed other aromatic rings optionally containing hetero atoms, or a radical conforming to formula (II) or (III)

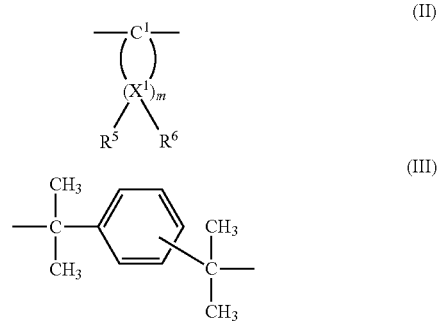

The substituents B independently one of the others denote $C_1$- to $C_{12}$-alkyl, preferably methyl,
x independently one of the others denote 0, 1 or 2,
p represents 1 or 0, and
$R^5$ and $R^6$ are selected individually for each $X^1$ and each independently of the other denote hydrogen or $C_1$- to $C_6$-alkyl, preferably hydrogen, methyl or ethyl,
$X^1$ represents carbon, and m represents an integer of 4 to 7, preferably 4 or 5, with the proviso that on at least one atom $X^1$, $R^5$ and $R^6$ are both alkyl groups.

Preferred aromatic dihydroxy compounds are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl)ethers, bis-(hydroxyphenyl) sulfoxides, bis-(hydroxyphenyl)ketones, bis-(hydroxyphenyl)-sulfones and α,α-bis-(hydroxyphenyl)-diisopropyl-benzenes. Particularly preferred aromatic dihydroxy compounds are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl-sulfone. Special preference is given to 2,2-bis-(4-hydroxyphenyl)-propane (bisphenol A). These compounds may be used individually or in the form of any desired mixtures.

Chain terminators suitable for the preparation of thermoplastic aromatic polycarbonates include phenol, p-chlorophenol, p-tert.-butylphenol, as well as long-chained alkylphenols, such as 4-(1,3-tetra-methylbutyl)-phenol or monoalkylphenols or dialkylphenols having a total of from 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)-phenol. The amount of chain terminators to be used is generally 0.5 to 10% based on the total molar amount of the aromatic dihydroxy compounds used. The polycarbonates may be branched in a known manner, preferably by the incorporation of 0.05 to 2.0%, based on the sum of the molar amount of the aromatic dihydroxy compounds use, of compounds having a functionality of three or more, for example compounds having three or more phenolic groups.

Aromatic polyestercarbonates are known. Suitable such resins are disclosed in U.S. Pat. Nos. 4,334,053: 6,566,428 and in CA 1173998 all incorporated herein by reference.

Aromatic dicarboxylic acid dihalides for the preparation of aromatic polyester carbonates include diacid dichlorides of isophthalic acid, terephthalic acid, diphenyl ether 4,4'-dicarboxylic acid and naphthalene-2,6-dicarboxylic acid. Particularly preferred are mixtures of diacid dichlorides of isophthalic acid and terephthalic acid in a ratio of from 1:20 to 20:1. Branching agents may also be used in the preparation of suitable polyestercarbonates, for example, carboxylic acid chlorides having a functionality of three or more, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in amounts of 0.01 to 1.0 mol. % (based on dicarboxylic acid dichlorides used), or phenols having a functionality of three or more, such as phloroglucinol, 4,6-dimethyl-2,4,6-tri-(4-hydroxyphenyl)-heptene-2,4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methylphenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, in amounts of from 0.01 to 1.0 mol. %, based on diphenols used. Phenolic branching agents can be placed in the reaction vessel with the diphenols, acid chloride branching agents may be introduced together with the acid dichlorides.

The content of carbonate structural units in the thermoplastic aromatic polyester carbonates is preferably up to 100 mol. %, especially up to 80 mol. %, particularly preferably up to 50 mol. %, based on the sum of ester groups and carbonate groups. Both the esters and the carbonates contained in the aromatic polyester carbonates may be present in the polycondensation product in the form of blocks or in a randomly distributed manner.

The thermoplastic aromatic poly(ester)carbonates have weight-average molecular weights (measured by gel permeation chromatography) of at least 25,000, preferably at least 26,000. Preferably these have maximum weight-average molecular weights of 35,000, more preferably up to 32,000, particularly preferably up to 30,000 g/mol. The thermoplastic aromatic poly(ester)carbonates may be used alone or in any desired mixture.

Component B

The polyalkylene terephthalates are reaction products of aromatic dicarboxylic acids or reactive derivatives thereof, such as dimethyl esters or anhydrides, and aliphatic, cycloaliphatic or aralipathic diols, and mixtures of those reaction products. Preferred polyalkylene terephthalates contain at least 80%, preferably at least 90%, based on the dicarboxylic acid component, of terephthalic acid radicals and at least 80%, preferably at least 90%, based on the moles of the diol component, of ethylene glycol and/or 1,4-butanediol radicals.

The preferred polyalkylene terephthalates may contain, in addition to terephthalic acid radicals, up to 20 mol. %, preferably up to 10 mol. %, of radicals of other aromatic or cycloaliphatic dicarboxylic acids having from 8 to 14 carbon atoms or aliphatic dicarboxylic acids having from 4 to 12 carbon atoms, such as radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

Also preferred are polyalkylene terephthalates that contain, in addition to ethylene glycol or 1,4-butanediol radicals, up to 20 mol. %, preferably up to 10 mol. %, of other aliphatic diols having from 3 to 12 carbon atoms or cycloaliphatic diols having from 6 to 21 carbon atoms, for example radicals of 1,3-propanediol, 2-ethyl-1,3-propanediol, neopentyl glycol, 1,5-pentanediol, 1,6-hexanediol, cyclohexane-1,4-dimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxy-phenyl)-propane and 2,2-bis-(4-hydroxypropoxyphenyl)-propane (see U.S. Pat. No. 4,176,224 incorporated herein by reference).

The polyalkylene terephthalates may be branched by the incorporation of relatively small amounts of tri- or tetrahydric alcohols or tri- or tetra-basic carboxylic acids, for example according to U.S. Pat. No. 3,692,744 (incorporated herein by reference) Examples of preferred branching agents are trimesic acid, trimellitic acid, trimethylol-ethane and -propane and pentaerythritol.

Particular preference is given to polyethylene terephthalates and/or polybutylene terephthalates, with polyethylene terephthalate being especially preferred.

The polyalkylene terephthalates preferably have an intrinsic viscosity of ≤1.4 cm$^3$/g, measured in phenol/o-dichlorobenzene (1:1 parts by weight) at 25° C. using an Ubbelohde viscometer; in general, the intrinsic viscosity of the polyalkylene terephthalates is greater than 0.3 cm$^3$/g, especially greater than 0.4 cm$^3$/g.

The polyalkylene terephthalates are known, may be prepared by known methods (e.g. Kunststoff-Handbuch, Volume VIII, p. 695 et seq., Carl-Hanser-Verlag, Munich 1973) and are available in commerce.

Component C

The graft (co)polymer suitable in the context of the invention has core/shell structure. It may be obtained by graft polymerizing alkyl(meth)acrylate and optionally a copolymerizable vinyl monomer onto a composite rubber core. The composite rubber core that includes interpenetrated and inseparable interpenetrating network (IPN) type polymer is characterized in that its glass transition temperature is below 0° C., preferably below −20° C., especially below −40° C. The amount of component C present in the inventive composition is 1 to 20, advantageously 2 to 15, preferably 5 to 12, most preferably 7 to 10 phr.

The preferred core is polysiloxane-alkyl(meth)acrylate interpenetrating network (IPN) type polymer that contains polysiloxane and butylacrylate. The shell is a rigid phase, preferably polymerized of methylmethacrylate. The weight ratio of polysiloxane/alkyl(meth)acrylate/rigid shell is 70-90/5-15/5-15, preferably 75-85/7-12/7-12, most preferably 80/10/10.

The rubber core has median particle size (d$_{50}$ value) of 0.05 to 5, preferably 0.1 to 2 microns, especially 0.1 to 1 micron.

The median value may be determined by ultracentrifuge measurement (W. Scholtan, H. Lange, Kolloid, Z. und Z. Polymere 250 (1972), 782-1796).

The polyorganosiloxane component in the silicone acrylate composite rubber may be prepared by reacting an organosiloxane and a multifunctional crosslinker in an emulsion polymerization process. It is also possible to insert graft-active sites into the rubber by addition of suitable unsaturated organosiloxanes.

The organosiloxane is generally cyclic, the ring structures preferably containing from 3 to 6 Si atoms. Examples include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, which may be used alone or in a mixture of 2 or more such compounds. The organosiloxane component is present in the silicone acrylate rubber in an amount of at least 70%, preferably at least 75%, based on weight of the silicone acrylate rubber.

Suitable crosslinking agents are tri- or tetra-functional silane compounds. Preferred examples include trimethoxymethylsilane, triethoxyphenylsilane, tetramethoxysilane, tetraethoxysilane, tetra-n-propoxysilane, tetrabutoxysilane.

Graft-active sites may be included into the polyorganosiloxane component of the silicone acrylate rubber by incorporating a compound conforming to any of the following structures:

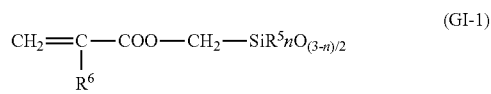
(GI-1)

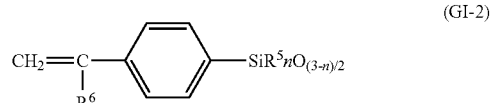
(GI-2)

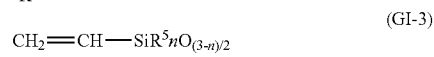
(GI-3)

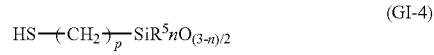
(GI-4)

wherein
R$^5$ denotes methyl, ethyl, propyl or phenyl,
R$^6$ denotes hydrogen or methyl,
n denotes 0, 1 or 2, and
p denotes 1 to 6.

(Meth)acryloyloxysilane is a preferred compound for forming the structure (GI-1). Preferred (meth)acryloyloxysilanes include β-methacryloyloxyethyl-dimethoxy-methyl-silane, γ-methacryloyl-oxy-propylmethoxy-dimethyl-silane, γ-methacryloyloxypropyl-dimethoxy-methyl-silane, γ-methacryloyloxypropyl-trimethoxy-silane, γ-methacryloyloxypropyl-ethoxy-diethyl-silane, γ-methacryloyloxypropyl-diethoxy-methyl-silane, γ-methacryloyloxy-butyl-diethoxymethyl-silane.

Vinylsiloxanes, especially tetramethyl-tetravinyl-cyclotetrasiloxane, are suitable for forming the structure GI-2.

p-Vinylphenyl-dimethoxy-methylsilane, for example, is suitable for forming structure GI-3. γ-Mercaptopropyldimethoxy-methylsilane, γ-mercaptopropylmethoxy-dimethylsilane, γ-mercaptopropyl-diethoxymethylsilane, etc. are suitable for forming structure (GI-4).

The amount of these compounds is from up to 10%, preferably 0.5 to 5.0% (based on the weight of polyorganosiloxane).

The acrylate component in the silicone acrylate composite rubber may be prepared from alkyl(meth)acrylates, crosslinkers and graft-active monomer units.

Examples of preferred alkyl(meth)acrylates include alkyl acrylates, such as methyl acrylate, ethyl acrylate, n-propyl acrylate, n-butyl acrylate, 2-ethylhexyl acrylate, and alkyl methacrylates, such as hexyl methacrylate, 2-ethylhexyl methacrylate, n-lauryl methacrylate, n-butyl acrylate is particularly preferred.

Multifunctional compounds may be used as crosslinkers. Examples include ethylene glycol dimethacrylate, propylene glycol dimethacrylate, 1,3-butylene glycol dimethacrylate and 1,4-butylene glycol dimethacrylate.

The following compounds individually or in mixtures may be used for inserting graft-active sites: allyl methacrylate, triallyl cyanurate, triallyl isocyanurate, allyl methacrylate. Allyl methacrylate may also act as crosslinker. These compounds may be used in amounts of 0.1 to 20%, based on the weight of acrylate rubber component.

Methods of producing the silicone acrylate composite rubbers which are preferably used in the compositions according to the invention, and their grafting with monomers, are described, for example, in U.S. Pat. Nos. 4,888,388 and 4,963,619 both incorporated herein by reference.

The graft polymerization onto the graft base (herein C.1) may be carried out in suspension, dispersion or emulsion. Continuous or discontinuous emulsion polymerization is preferred. The graft polymerization is carried out with free-radical initiators (e.g. peroxides, azo compounds, hydroperoxides, persulfates, perphosphates) and optionally using anionic emulsifiers, e.g. carboxonium salts, sulfonic acid salts or organic sulfates.

The graft shell (C.2) may be formed of a mixture of

C.2.1 0 to 80%, preferably 0 to 50%, especially 0 to 25% (based on the weight of the graft shell), of vinyl aromatic compounds or ring-substituted vinyl aromatic compounds (e.g. styrene, α-methylstyrene, p-methylstyrene), vinyl cyanides (e.g. acrylonitrile and methacrylonitrile), and C.2.2 100 to 20%, preferably 100 to 50%, especially 100 to 75% (based on the weight of the graft shell) of at least one monomer selected from the group consisting of (meth) acrylic acid ($C_1$-$C_8$)-alkyl esters (e.g. methyl methacrylate, n-butyl acrylate, tert.-butyl acrylate) and derivatives (e.g. anhydrides and imides) of unsaturated carboxylic acids (e.g. maleic anhydride and N-phenyl maleimide).

The preferred graft shell includes one or more (meth) acrylic acid ($C_1$-$C_8$)-alkyl esters, especially methyl methacrylate.

Particularly suitable graft (co)polymer is available from Mitsubishi Rayon Co., Ltd. as Metablen SX-005.

Component D

Phosphorus-containing compounds suitable in the context of the invention include oligomeric organic phosphoric or phosphonic acid esters conforming structurally to formula (IV)

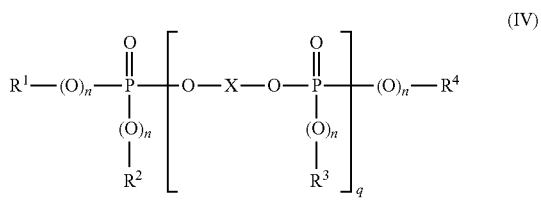

(IV)

wherein
$R^1$, $R^2$, $R^3$ and $R^4$ independently one of the others, each represents $C_1$- to $C_8$-alkyl, or $C_{5-6}$-cycloalkyl, $C_{6-20}$-aryl or $C_{7-12}$-aralkyl each optionally substituted by alkyl, preferably by $C_{1-4}$-alkyl, n independently one of the others denotes 0 or 1, preferably 1, q denotes 0.5 to 30, preferably 0.8 to 15, particularly preferably 1 to 5, especially 1 to 2, and X is a mono- or poly-nuclear aromatic radical having from 6 to 30 carbon atoms, or an aliphatic radical having from 2 to 30 carbon atoms, which may be OH-substituted and may contain up to 8 ether bonds. The aliphatic radical may be linear or branched.

Preferably, $R^1$, $R^2$, $R^3$ and $R^4$ each independently of the others represents $C_{1-4}$-alkyl, phenyl, naphthyl or phenyl-$C_{1-4}$-alkyl. In the embodiments where any of $R^1$, $R^2$, $R^3$ and $R^4$ is aromatic, it may be substituted by alkyl groups, preferably by $C_{1-4}$-alkyl. Particularly preferred aryl radicals are cresyl, phenyl, xylenyl, propylphenyl or butylphenyl.

In the preferred embodiment X represents a mono- or poly-nuclear aromatic radical having from 6 to 30 carbon atoms. It is preferably derived from any of the aromatic dihydroxy compounds of formula (I).

X particularly preferably represents at least one member selected from the group consisting of

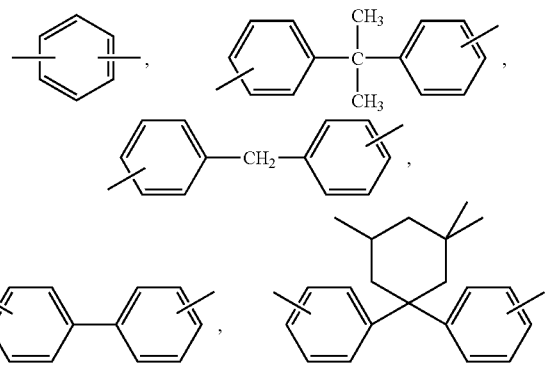

Especially, X may be derived from resorcinol, hydroquinone, bisphenol A or diphenylphenol and particularly preferably from bisphenol A.

Further suitable phosphorus-containing compounds are compounds of formula (IVa)

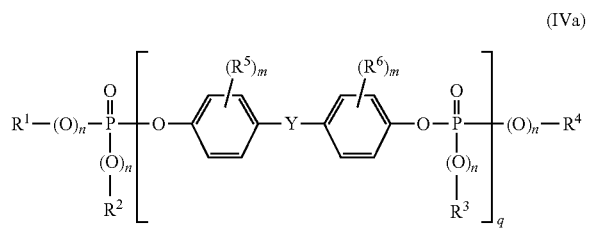

(IVa)

wherein
$R^1$, $R^2$, $R^3$, $R^4$, n and q are as defined for formula (IV),
m independently one of the others represents 0, 1, 2, 3 or 4,
$R^5$ and $R^6$ independently one of the others represents $C_{1-4}$-alkyl, preferably methyl or ethyl, and
Y represents $C_1$- to $C_7$-alkylidene, $C_{1-7}$-alkylene, $C_{5-12}$-cycloalkylene, $C_{5-12}$-cycloalkylidene, —O—, —S—, —$SO_2$ or —CO—, preferably isopropylidene or methylene.

Particularly preferred is

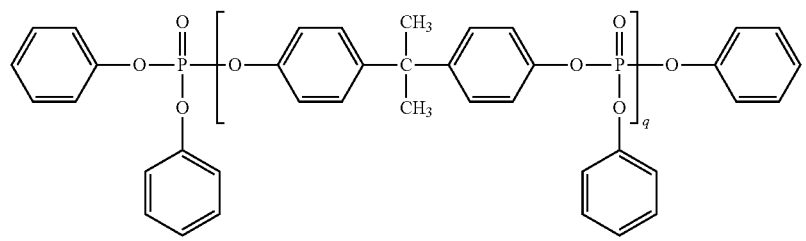

wherein q is 1 to 2.

Such phosphorus compounds are known (see, for example, U.S. Pat. Nos. 5,204,394 and 5,672,645, both incorporated herein by reference) or may be prepared by known methods (e.g. Ullmanns Enzyklopädie der technischen Chemie, Vol. 18, p. 301 et seq. 1979; Houben-Weyl, Methoden der organischen Chemie, Vol. 12/1, p. 43; Beilstein Vol. 6, p. 177).

Component E

Fluorinated polyolefins are known (e.g., U.S. Pat. No. 5,672,645 incorporated herein by reference) and commercially available such as Teflon® 30N fluorinated polyolefin from DuPont.

The fluorinated polyolefins may be used either as such or in the form of a coagulated mixture. The preparation of a coagulated mixture entails mixing an emulsion of the fluorinated polyolefins with an emulsion of the graft polymer or with an emulsion of a vinyl-monomer-based (co)polymer, and coagulating the mixture.

The fluorinated polyolefins may also be used as a precompound with the graft polymer (component C) by mixing the polyolefin powder with a powder or with granules of the graft polymer and compounding in conventional devices in the melt, generally at temperatures of from 200 to 330° C.

The fluorinated polyolefin is used in the composition at concentrations of 0.1 to 2, preferably 0.2 to 1, most preferably 0.2 to 0.5 phr.

Other Components

The inventive composition may further include additives that are known for their function in the context of thermoplastic molding compositions that contain poly(ester)carbonates. These include any one or more of lubricants, mold release agents, for example pentaerythritol tetrastearate, nucleating agents, antistatic agents, thermal stabilizers, light stabilizers, hydrolytical stabilizers, fillers and reinforcing agents, colorants or pigments, as well as further flame retarding agents or a flame retarding synergists.

The inventive compositions may be prepared conventionally using conventional equipment and following conventional procedures.

The inventive composition may be used to produce moldings of any kind by thermoplastic processes such as injection molding, extrusion and blow molding methods.

The Examples which follow are illustrative of the invention.

EXAMPLES

In the preparation of exemplified compositions, the components and additives were melt compounded in a twin screw extruder ZSK 30 at a temperature profile from 120 to 255° C. The pellets obtained were dried in a forced air convection oven at 120° C. for 4 to 6 hours. The parts were injection molded (melt temperature 265 to 285° C., mold temperature about 75° C.).

In preparing the compositions described below the following components were used:

Polycarbonate: a bisphenol-A based homopolycarbonate having melt flow rate of about 4 g/10 min (at 300° C., 1.2 Kg) per ASTM D 1238 (Makrolon 3208, a product of Bayer MaterialScience LLC)

PET: polyethylene terephthalate having an intrinsic viscosity of 0.94

Elastomer 1: methyl methacrylate (MMA)—grafted siloxane(Si)-butyl acrylate (BA) composite rubber containing MMA shell and Si-BA in the core. The weight ratio of Si/BA/MMA is 80/10/10.

Elastomer 2 (comparative): methyl methacrylate (MMA)—grafted siloxane(Si)-butyl acrylate (BA) composite rubber containing MMA shell and Si-BA in the core. The weight ratio of Si/BA/MMA is 10/80/10.

The phosphorous compound (designated P-compound) used conforms to

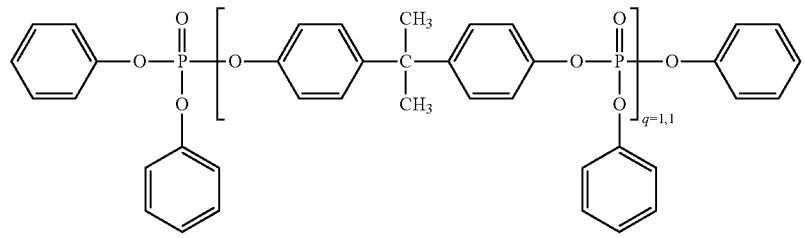

All exemplified compositions contained 0.25 phr fluorinated polyolefin (PTFE) introduced in the form of a masterbatch containing 50 wt. % styrene-acrylonitrile copolymer and 50 wt. % PTFE.

The notched impact strength (NI) at the indicated temperature was determined in accordance with ASTM D-256 using specimens ⅛" in thickness. Failure mode (mode) was determined by observation, P means partial break, C means complete break.

The flammability rating was determined according to UL-94 V on specimens having the indicated thickness The melt flow rates (MFR) of the compositions were determined in accordance with ASTM D-1238 at 265° C., 5 Kg load. Vicat temperature (Vicat) was determined in accordance with ASTM D 1525 with a load of 50 Newton and a heating rate of 120° C./hour.

TABLE 1

| | Example | | | | |
|---|---|---|---|---|---|
| | 1 | 2 | 3 | 4 | 5 |
| Polycarbonate, pbw | 85 | 85 | 85 | 85 | 85 |
| PET, pbw, | 15 | 15 | 15 | 15 | 15 |
| Elastomer 2, phr | 10 | 0 | 0 | 0 | 0 |
| Elastomer 1, phr | | 10 | 6 | 10 | 6 |
| P-compound, phr | 10 | 10 | 10 | 6 | 6 |
| PTFE, phr | 0.25 | 0.25 | 0.25 | 0.25 | 0.25 |
| Properties | | | | | |
| MFR, g/10 min | 18.9 | 15.1 | 15.7 | 12.5 | 12.2 |
| NI @ 23° C./mode, ft-lb/in | 18.5/P[(1)] | 18.5/P | 19.6/P | 19.6/p | 20.4/P |
| NI @ −20° C./mode, ft-lb/in | 2.1/C[(2)] | 8.0/P | 1.6/C | 8.9/P | 8.9/P |
| Vicat, ° C. | 109.4 | 108.1 | 110.7 | 118.4 | 121.0 |
| Flammability, UL94 1.6 mm | V-2 | V-1 | V-1 | V-1 | V-1 |

[(1)]P indicates partial break
[(2)]C indicates complete break

Examples 1 (comparative) and 2 (inventive) enable a direct comparison of the inventive composition to closely related compositions. The difference between these compositions is the structure of the included elastomer. The results show greater ductility and the advantageous low temperature-impact resistance of the inventive composition. The results also show that the inclusion of a P-compound and fluorinated polyolefin imparts better flame resistance (UL-94 at 1.6 mm) to the inventive composition (V-1). Example 3 shows that with a lower loading of the rubber modifier, the inventive composition maintains its good notched Izod impact strength at room temperature and −20° C. with a better UL-94 rating (V-1). Example 4 shows that even with a lower loading of P-compound, the inventive composition has a better UL-94 rating (V-1) with much better low temperature notched Izod impact strength and much higher Vicat temperature. Example 5 shows that with reducing both rubber modifier loading and P-compound loading, the inventive composition has better UL-94 rating (V-1), much better low temperature notched Izod impact strength, and much higher Vicat temperature.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising:
   A) 70 to 85 parts by weight of aromatic poly(ester) carbonate;
   B) 15 to 30 parts by weight of polyalkylene terephthalate; wherein the weight of A) and B) totals 100 parts resin;
   C) 1 to 20 parts per hundred parts resin (phr) of graft (co)polymer having a core-shell morphology, including a grafted shell that contains polymerized alkyl(meth) acrylate and a composite rubber core that contains interpenetrated and inseparable polyorganosiloxane and poly(meth)alkyl acrylate components, wherein said core is in the form of particles having median particle size of 0.05 to 5 microns and glass transition temperature below 0° C., and wherein weight ratio of polyorganosiloxane/poly(meth)alkylacrylate/rigid shell is about 80 parts polyorganosiloxane, about 10 parts poly(meth)alkylacrylate, and about 10 parts rigid shell;
   D) 2 to 20 phr of a phosphorous-containing compound; and
   E) 0.1 to 2 parts by weight of a fluorinated polyolefin;
   wherein component B is present at a level of greater than 10% by weight of the thermoplastic molding composition.

2. The composition according to claim 1, wherein component B is polyethylene terephthalate.

3. The composition of claim 1 wherein the alkyl(meth)acrylate is butylacrylate.

4. The composition of claim 1 wherein the median particle size is 0.1 to 2 microns.

5. The composition of claim 1, wherein component D conforms to formula (IV)

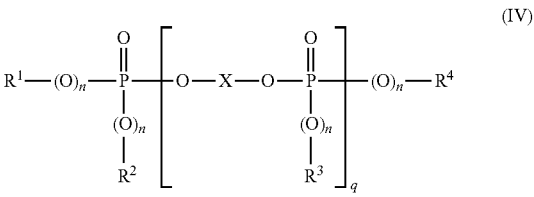

wherein
$R^1$, $R^2$, $R^3$ and $R^4$ each independently of the others represents $C_{1-8}$-alkyl, or $C_{5-6}$-cycloalkyl, $C_{6-20}$-aryl or $C_{7-12}$-aralkyl each optionally substituted by alkyl,
n independently one of the others is 0 or 1,
q denotes 0.5 to 30, and
X is a mono- or poly-nuclear aromatic radical having 6 to 30 carbon atoms, or a linear or branched aliphatic radical having 2 to 30 carbon atoms, which may be OH-substituted and may contain up to 8 ether bonds.

6. The composition according to claim 1 further containing at least one member selected from the group consisting of lubricant, mold-release agent, nucleating agent, antistatic, thermal stabilizer, hydrolytical stabilizer, light stabilizer, colorant, pigment, filler, reinforcing agent, flameproofing agent other than component D), and flameproofing synergist.

7. A thermoplastic molding composition comprising:
   A) 70 to 85 parts by weight of aromatic poly(ester) carbonate;
   B) 15 to 30 parts by weight of polyalkylene terephthalate; wherein the weight of A) and B) totals 100 parts resin;
   C) 5 to 12 parts per hundred parts resin (phr) of graft (co)polymer having a core-shell morphology, including a grafted shell that contains polymerized alkyl(meth)acrylate and a composite rubber core that contains interpenetrated and inseparable polyorganosiloxane and poly(meth)alkyl acrylate components, wherein said core is in the form of particles having median particle size of 0.05 to 5 microns and glass transition temperature below 0° C., and wherein weight ratio of polyorganosiloxane/poly(meth)alkylacrylate/rigid shell is about 75 to about 85 parts polyorganosiloxane, about 7 to about 12 parts poly(meth)alkylacrylate, and about 7 to about 12 parts rigid shell;
   D) 2 to 20 phr of a phosphorous-containing compound; and
   E) 0.1 to 2 parts by weight of a fluorinated polyolefin;
   wherein component B is present at a level of greater than 10% by weight of the thermoplastic molding composition.

8. The composition according to claim 7, wherein the grafted shell of component C about 80 parts polyorganosiloxane, about 10 parts poly(meth)alkylacrylate, and about 10 parts rigid shell.

9. The composition according to claim 7, wherein component B is polyethylene terephthalate.

10. The composition of claim 7 wherein the alkyl(meth)acrylate is butylacrylate.

11. The composition of claim 7 wherein the median particle size is 0.1 to 2 microns.

12. The composition of claim 7, wherein component D conforms to formula (IV)

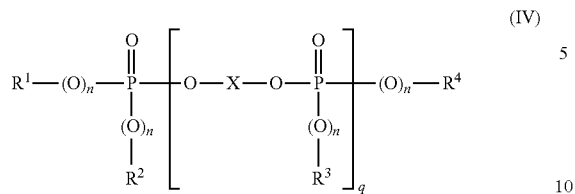

wherein
$R^1$, $R^2$, $R^3$ and $R^4$ each independently of the others represents $C_{1-8}$-alkyl, or $C_{5-6}$-cycloalkyl, $C_{6-20}$-aryl or $C_{7-12}$-aralkyl each optionally substituted by alkyl,
n independently one of the others is 0 or 1,
q denotes 0.5 to 30, and
X is a mono- or poly-nuclear aromatic radical having 6 to 30 carbon atoms, or a linear or branched aliphatic radical having 2 to 30 carbon atoms, which may be OH-substituted and may contain up to 8 ether bonds.

13. The composition according to claim 7 further containing at least one member selected from the group consisting of lubricant, mold-release agent, nucleating agent, antistatic, thermal stabilizer, hydrolytical stabilizer, light stabilizer, colorant, pigment, filler, reinforcing agent, flameproofing agent other than component D), and flameproofing synergist.

* * * * *